(12) United States Patent
Heigl et al.

(10) Patent No.: US 7,551,995 B2
(45) Date of Patent: Jun. 23, 2009

(54) DOOR AND RAMP INTERFACE SYSTEM

(75) Inventors: Keith D. Heigl, Winamac, IN (US);
Justin C. Gilmore, Monticello, IN (US);
Andrew L. Henseleit, LaPorte, IN (US)

(73) Assignee: The Braun Corporation, Winamac, IN (US)

( * ) Notice: Subject to any disclaimer, the term of this patent is extended or adjusted under 35 U.S.C. 154(b) by 5 days.

(21) Appl. No.: 11/837,993

(22) Filed: Aug. 13, 2007

(65) Prior Publication Data
US 2008/0044268 A1 Feb. 21, 2008

Related U.S. Application Data

(60) Provisional application No. 60/822,666, filed on Aug. 17, 2006.

(51) Int. Cl.
*G05D 1/00* (2006.01)
(52) U.S. Cl. .............................. 701/36; 701/1; 701/49; 318/445; 49/35; 49/49; 307/9.1; 307/10.1; 180/281
(58) Field of Classification Search ........... 701/1, 701/36, 49; 318/445; 49/35, 49; 307/9.1, 307/10.1; 180/281
See application file for complete search history.

(56) References Cited

U.S. PATENT DOCUMENTS

| | | | |
|---|---|---|---|
| 3,651,965 A | 3/1972 | Simonelli et al. | |
| 3,874,527 A | 4/1975 | Royce | |
| 4,164,292 A | 8/1979 | Karkau | |
| 4,176,999 A | 12/1979 | Thorley | |
| 4,251,179 A | 2/1981 | Thorley | |
| 4,325,668 A | 4/1982 | Julian et al. | |
| 4,339,224 A | 7/1982 | Lamb | |
| 4,576,539 A | 3/1986 | Williams | |
| 5,140,316 A | 8/1992 | DeLand et al. | |
| 5,180,275 A | 1/1993 | Czech et al. | |
| 5,261,779 A | 11/1993 | Goodrich | |
| 5,293,632 A | 3/1994 | Novakovich et al. | |
| 5,299,904 A | 4/1994 | Simon et al. | |
| 5,305,355 A | 4/1994 | Go et al. | |
| 5,308,214 A | 5/1994 | Crain et al. | |

(Continued)

OTHER PUBLICATIONS

"The 1999 Ford Windstar," *VMI Voice Technical Edition*, Publication, (Apr. 1999).

(Continued)

*Primary Examiner*—Khoi Tran
*Assistant Examiner*—Nikhil Sriraman
(74) *Attorney, Agent, or Firm*—Michael Best & Friedrich LLP

(57) ABSTRACT

An access system for a vehicle includes a gateway module that connects to the vehicle data bus, and an interface system coupled to the gateway module via a gateway bus. The interface system is also coupled to a ramp control subsystem that operates to stow and deploy a ramp for providing wheelchair access to the vehicle. A door control subsystem is coupled to the vehicle data bus and operates in response to data signals sent over the vehicle data bus. The gateway module is configured to relay signals relating to the status of the ramp from the gateway bus to the vehicle data bus to coordinate operation of the door and the ramp.

20 Claims, 12 Drawing Sheets

U.S. PATENT DOCUMENTS

| | | |
|---|---|---|
| 5,350,986 A | 9/1994 | Long et al. |
| 5,380,144 A | 1/1995 | Smith et al. |
| 5,389,920 A | 2/1995 | DeLand et al. |
| 5,391,041 A | 2/1995 | Stanbury et al. |
| 5,396,158 A | 3/1995 | Long et al. |
| 5,434,487 A | 7/1995 | Long et al. |
| 5,697,048 A | 12/1997 | Kimura |
| 5,737,335 A | 4/1998 | Mizuta et al. |
| 5,825,098 A | 10/1998 | Darby et al. |
| 5,835,873 A | 11/1998 | Darby et al. |
| 5,979,114 A | 11/1999 | Clark et al. |
| 6,028,537 A | 2/2000 | Suman et al. |
| 6,042,327 A | 3/2000 | Deleo et al. |
| 6,053,693 A | 4/2000 | Ringdahl et al. |
| 6,064,165 A | 5/2000 | Boisvert et al. |
| 6,075,460 A | 6/2000 | Minissale et al. |
| 6,077,025 A | 6/2000 | Budd et al. |
| 6,179,545 B1 | 1/2001 | Petersen, Jr. et al. |
| 6,238,169 B1 | 5/2001 | Duputy et al. |
| 6,275,167 B1 | 8/2001 | Dombrowski et al. |
| 6,300,879 B1 | 10/2001 | Regan et al. |
| 6,302,439 B1 | 10/2001 | McCurdy |
| 6,357,992 B1 | 3/2002 | Ringdahl et al. |
| 6,515,377 B1 | 2/2003 | Ubelein et al. |
| 6,594,565 B1 | 7/2003 | Schafer et al. |
| 6,825,628 B2 | 11/2004 | Heigl et al. |
| 7,274,980 B1 * | 9/2007 | Schafer et al. ............... 701/36 |
| 2003/0007851 A1 | 1/2003 | Heigl et al. |
| 2003/0044266 A1 | 3/2003 | Vandillen et al. |
| 2005/0177288 A1 * | 8/2005 | Sullivan et al. ............... 701/36 |
| 2006/0104775 A1 | 5/2006 | Kasten et al. |
| 2006/0124375 A1 | 6/2006 | Lahr et al. |
| 2007/0267992 A1 * | 11/2007 | Edwards ................... 318/445 |

OTHER PUBLICATIONS

"Activan, Accessibility with Style, Conversion of General Motors Minivans," Service Manual, (Dec. 9, 1999), *Published by Ricon Corporation*.

"Braun Entervan," Brochure, (2001), *Published by The Braun Corporation*.

"Entervan, the Braun Corporation," Series 03 and later Fully-Automatic 1996 and newer Chrysler Entervan II, Owner's/Service Manual, (Revision Aug. 1998), 5230096-03.

Holicky, Richard, "Big Vans, Minivans Pros and Cons," *New Mobility Magazine*, (Jun. 1997).

"Honda Odyssey Minivan Conversion," Owner's Manual, (Oct. 2006), *Published by VMI*.

"New Ramp & Electrical Systems on All Power Rampvans," *www.ims-vans.com/RampElectrical.htm*, (May 12, 1999).

"Odyssey 2005-2006 Electrical Troubleshooting," Manual, (Mar. 2006), *Published by American Honda Motor Co., Inc.*

"Automotive: Serial Communication," Installation Guide Model MPC01 Multi-Purpose Controller, (1998), *Published by Whelan Engineering Company Inc.*, Chester, CT.

"Automotive: Serial Communication," Operating Guide MPC01 Multi-Purpose Controller, (1995), *Published by Whelan Engineering Company Inc.*, Chester, CT.

Sunderlin, Ann, "Van-Tastic, How'd They Do That," (Nov. 1995), *Paraplegia News Magazine*.

"Wheels 2000 and Beyond," *New Mobility Magazine*, p. 48, publicly available prior to Jan. 1, 2002.

"VMI-4 Ford Windstar Factory Door Lockout Relay Pack," "Operational Characteristics of the VMI-4 Module," *Technical Service Manual*, (Mar. 9, 2000).

\* cited by examiner

DOOR AND RAMP INTERFACE SYSTEM

CROSS-REFERENCE TO RELATED APPLICATIONS

This application claims the benefit and priority of U.S. Provisional Patent Application No. 60/822,666, filed Aug. 17, 2006, which is hereby incorporated by reference.

BACKGROUND

Access systems, such as motorized lifts, have been used to transport people and cargo. These access systems include platforms, ramps, moving seats, movable steps, and the like, which may be attached to stationary structures, such as buildings and loading docks, or mobile structures such as vehicles. Access systems have been used to provide disabled individuals access to structures that traditionally were accessible only via steps or stairs, or required an individual to step over or across an obstacle. For example, motorized lifts and ramps have been used to allow disabled individuals to enter and exit vehicles. In another example, motorized lifts have been used to load and/or unload stretchers from vehicles, such as ambulances. Motorized lifts have also been used on loading docks and trucks to allow cargo to be loaded, unloaded or otherwise moved.

When an access system is installed in a vehicle, such as a minivan, it is often integrated with an original equipment manufacturer ("OEM") or after market system (collectively, "OEM system") of the vehicle. The OEM system may often include an electronics package with a power sliding door subsystem, a part of most OEM electronics packages, that opens or closes the sliding door when it receives a signal to do so (a "door operation signal"). Other OEM subsystems such as a remote receiver, door control subsystem ("DCS") and a body control subsystem ("BCS") may also be involved in opening or closing the door. These electronic subsystems are interconnected through a vehicular data communications bus which enables the BCS, DCS, remote receiver and door switch to communicate with each other and to receive a door operation signal. Generally, the user may communicate a door operation signal to the power sliding door system by pulling on a door handle of the vehicle or pushing a button on a keyless entry device. If the door operation signal is produced by a remote device, the power sliding door system receives the door operation signal via the remote receiver. If the door operation signal is produced by movement of the door handle, the door operation signal causes the door switch to close, which communicates the door operation signal to the power sliding door system.

One example of a platform of vehicles into which access systems are installed is the Dodge Caravan / Chrysler Town & Country line of vehicles. These vehicles include an OEM data bus to which a number of OEM control modules are connected. The OEM control modules transmit status and command information over the OEM data bus to control the operation of a wide variety of vehicle systems including door locks, power sliding doors, anti-lock brakes, and the like. In certain cases, if a vehicle occupant activates a button, switch, or other input to request a particular action (e.g. opening a door), one or more of the OEM control modules sends a clearance request over the OEM data bus to determine whether or not the action should be performed. After the clearance request is initiated, the OEM control modules evaluate the status of a number of vehicle systems such as the transmission position, vehicle speed, and door lock position. If the OEM control modules determine that the status of each system is acceptable, the door control subsystem will be cleared to activate the motors and switches that unlatch and open the door. On the other hand, if it would not be appropriate to open the door (e.g. because the vehicle is in motion), at least one of the OEM control modules will send a signal over the OEM data bus that prevents the door control module from opening the door.

SUMMARY

When access systems are installed in vehicles with a power sliding door system as described above, the access system must interface with the power sliding door system to coordinate operation of the access system (e.g. the access ramp or lift operation) with door operation by the power sliding door subsystem. Interference between the door and the ramp or lift (hereinafter collectively referenced as a "ramp") generally only occurs when the ramp is not fully stowed. To prevent such interference, the access system may be installed so that it receives door operation commands from the OEM system. The access system may also communicate ramp status to the OEM system whenever the ramp is stowed or deployed.

To coordinate operation of the door and the ramp, the invention provides an access system for a vehicle having a door control system that opens and closes a vehicle door and that is coupled to a vehicle data bus. The access system includes a ramp control system having a ramp that is movable between a stowed position and a deployed position. The ramp provides access to the vehicle when the door is open and the ramp is deployed. The access system also includes an interface system that is coupled to and communicates with the ramp control system to initiate movement of the ramp between the stowed and deployed positions. The interface system also receives ramp status signals that indicate whether the ramp is stowed or deployed. A gateway module is coupled to the vehicle data bus for data communication with other vehicle systems and components that are coupled to the vehicle data bus. A gateway bus is coupled to and carries data signals between the gateway module and the interface system. To prevent operation of the door when the ramp is deployed, the interface system relays ramp status signals to the gateway module via the gateway bus, and the gateway module relays the ramp status signals to the door control system via the vehicle data bus. The door control system will not operate to close the door until it receives a data signal indicating that the ramp has been stowed.

BRIEF DESCRIPTION OF THE DRAWINGS

The invention can be better understood with reference to the following drawings and description. The components in the figures are not necessarily to scale, emphasis instead being placed upon illustrating the principles of the invention. In the figures, the same reference symbols designate the same parts, components, modules, subsystems or steps, unless and to the extent indicated otherwise.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
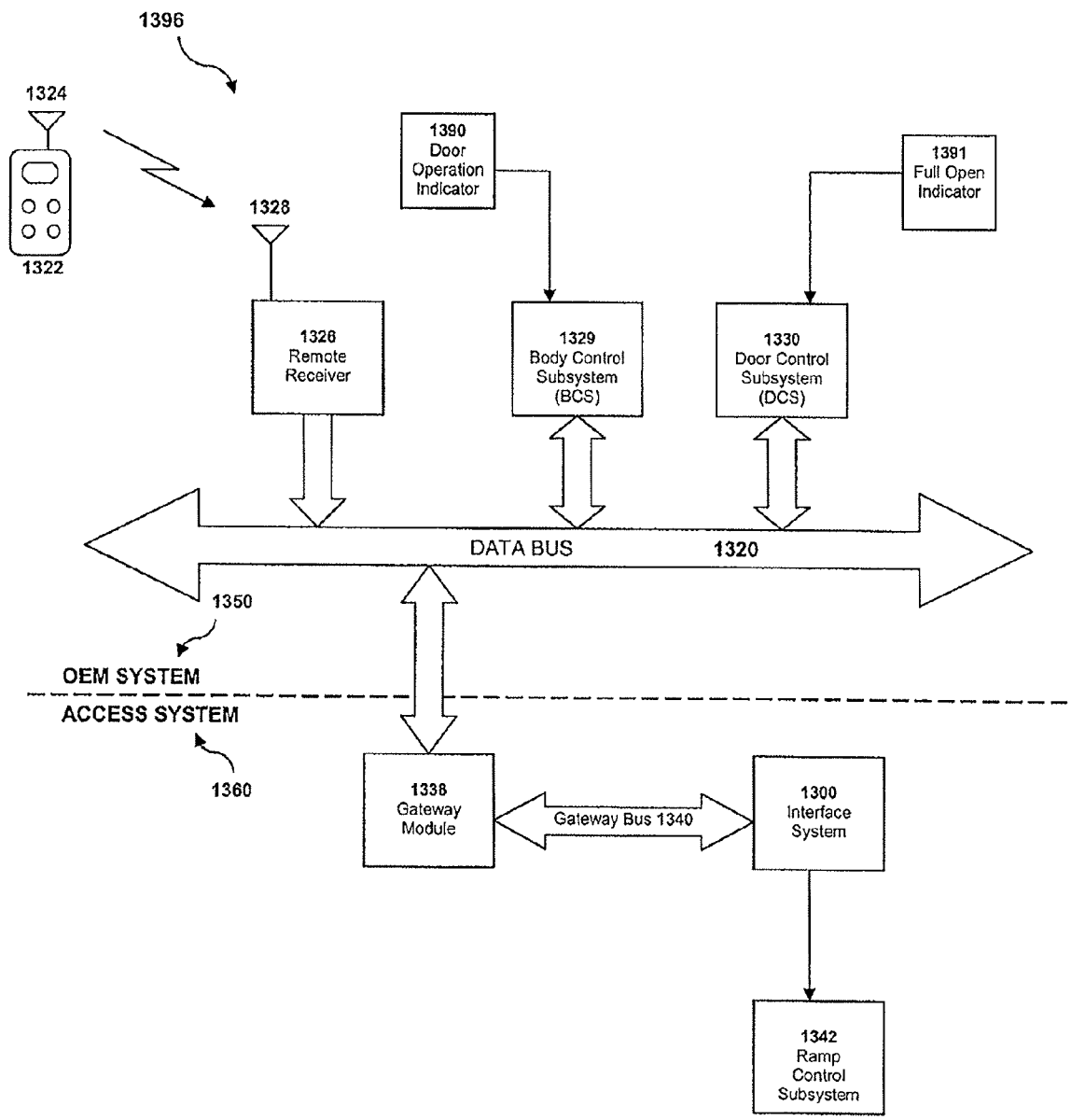
FIG. 1 is a functional block diagram of a door and ramp control system.

FIG. 1 illustrates an example of an interface system 1300 as implemented in a door and ramp control system 1396 of a vehicle. The interface system 1300 communicates and coordinates with a door control subsystem ("DCS") 1330 to prevent operational interference between a ramp (not shown) of an access system 1360 and the door of the vehicle (not shown), which is controlled by the DCS 1330. The DCS 1330 opens and closes the door of the vehicle upon receiving a signal or series of signals (an "activation signal") from other components of the OEM System 1350 authorizing the DCS 1330 to do so. The DCS is generally installed in the vehicle by the manufacturer of the vehicle, however in some instances the DCS may be installed by an aftermarket installer and/or provider.

To open and close the door of the vehicle, a user may activate the DCS 1330 by communicating an activation signal wirelessly from a remote unit 1322. For example, the user may communicate the activation signal via the remote unit's antenna 1324 to the antenna 1328 of a receiver 1326 on the vehicle. The receiver 1326 may communicate the activation signal with the DCS 1330 via the data bus 1320 and a body control subsystem "BCS" 1329. The remote unit 1322 may be implemented or included on a key fob. Alternately, the user may open and close the door by operating a handle on a door of the vehicle. Activating the door handle may trigger an indicator, such as a switch, indicating that the door is being operated (the "door operation indicator 1390"). In the illustrated embodiment, the door operation indicator 1390 produces and communicates an activation signal to the DCS 1330 via the BCS 1329 and the data bus 1320. The BCS 1329 controls communication of the activation signal from the remote receiver 1326 to the DCS 1330 when signals from other systems of the vehicle indicate that it is permissible to do so. For example, the BCS 1329 may communicate the activation signal to the DCS 1330 only when the vehicle is not moving and/or the engine of the vehicle is turned off.

A ramp control subsystem 1342 and the remainder of the access system deploy and stow a ramp to provide an alternative path for entering and exiting the vehicle. The ramp control subsystem 1342 and the remainder of the access system may be installed by a third party after the vehicle has been manufactured. In some cases the DCS 1330 includes a mechanism that will prevent operational interference between the door and the ramp. However, in other cases, additional signaling is necessary to ensure coordinated operation of the door and the ramp. As a result, the interface system 1300 may be installed in the vehicle with the access system 1360.

The interface system 1300 shown in FIG. 1 prevents operational interference between the ramp and the door through the use of status signals. For reasons, such as physical damage minimization, the interface system 1300 generally enables activation of the ramp only when the door of the vehicle is full open. Because vehicle manufacturers may be reluctant or unwilling to allow third parties to access the data bus 1320 of the vehicle and/or for other reasons, in some embodiments, including the illustrated embodiment, the interface system 1300 may not communicate directly with the data bus 1320.

As shown in FIG. 1, the interface system 1300 communicates with a gateway module 1338 by way of a gateway bus 1340, and the gateway module 1338 in turn communicates with the data bus 1320. The gateway module 1338 translates signals communicated over the gateway bus 1340 by the interface system 1300 into a format compatible with the signals sent over the data bus 1320 for receipt and interpretation by the other modules and subsystems (generally the OEM modules and subsystems) that are connected to the data bus 1320. For example, the interface system 1300 may communicate signals compatible with a LIN bus over the gateway bus 1340, but the data bus 1320 may be a CAN bus. Therefore, the gateway module 1338 may translate signals compatible with a LIN bus to signals compatible with a CAN bus, and may translate signals compatible with a CAN bus to signals compatible with a LIN bus. If the gateway bus 1340 and the data bus 1320 utilize the same protocol, it may not be necessary for the gateway module 1338 to translate the signals. In that case the gateway module 1338 may act primarily as a signal filter, selectively preventing or allowing signals to be transmitted from one of the data bus 1320 and the gateway bus 1340 to the other. The gateway module 1338 may also be configured to enable the interface system 1300 to communicate signals relating to the status of the ramp ("ramp status signals") with the BCS 1329 or the DCS 1330 via the data bus 1320 for coordination of door and ramp operation. The gateway module 1338 may also prevent certain signals sent by the interface system 1300 from being communicated to the OEM system 1350 in certain circumstances or until it is appropriate to do so. In this regard the gateway module 1338 of FIG. 1 is a two-way gateway module 1338 that operates to transfer status and command signals in both directions between the two systems.

To coordinate stowing and deploying of the ramp with operation of the door, the ramp control subsystem 1342 may be activated by the same activation signal that is carried on the data bus 1320 for activation of the DCS 1330. The activation signal can be communicated from the data bus 1320 to the interface system 1300 by of the gateway module 1338 and the gateway bus 1340. It should be appreciated that the activation signal on the data bus 1320 can be initiated from a variety of sources, including the door operation indicator 1390, which may cause the BCS 1329 to send the activation signal over the data bus 1320, or from the remote receiver 1326, which may send its own activation signal directly over the data bus 1320. The interface system 1300 also receives door status signals that the DCS 1330 sends over the data bus 1320 when the door is opened or closed. For example, when the door reaches a fully open position a full open indicator 1391 sends a signal to the DCS 1330, which in turn sends a door fully open signal over the data bus 1320 to inform the other modules and subsystems connected to the data bus 1320 that the door is fully open. The interface system 1300 receives the door fully open and other door status signals by way of the gateway module 1338 and the gateway bus 1340. Thus, the interface system 1300 knows whether the door is opened or closed and, therefore, whether it is appropriate to deploy or stow the ramp. By communicating ramp status signals to the data bus 1320, and receiving activation and door status signals from the data bus 1320 via the gateway 1338 and gateway bus 1340, the interface system 1300 prevents operational interference between the door and the ramp.

Figure 2:
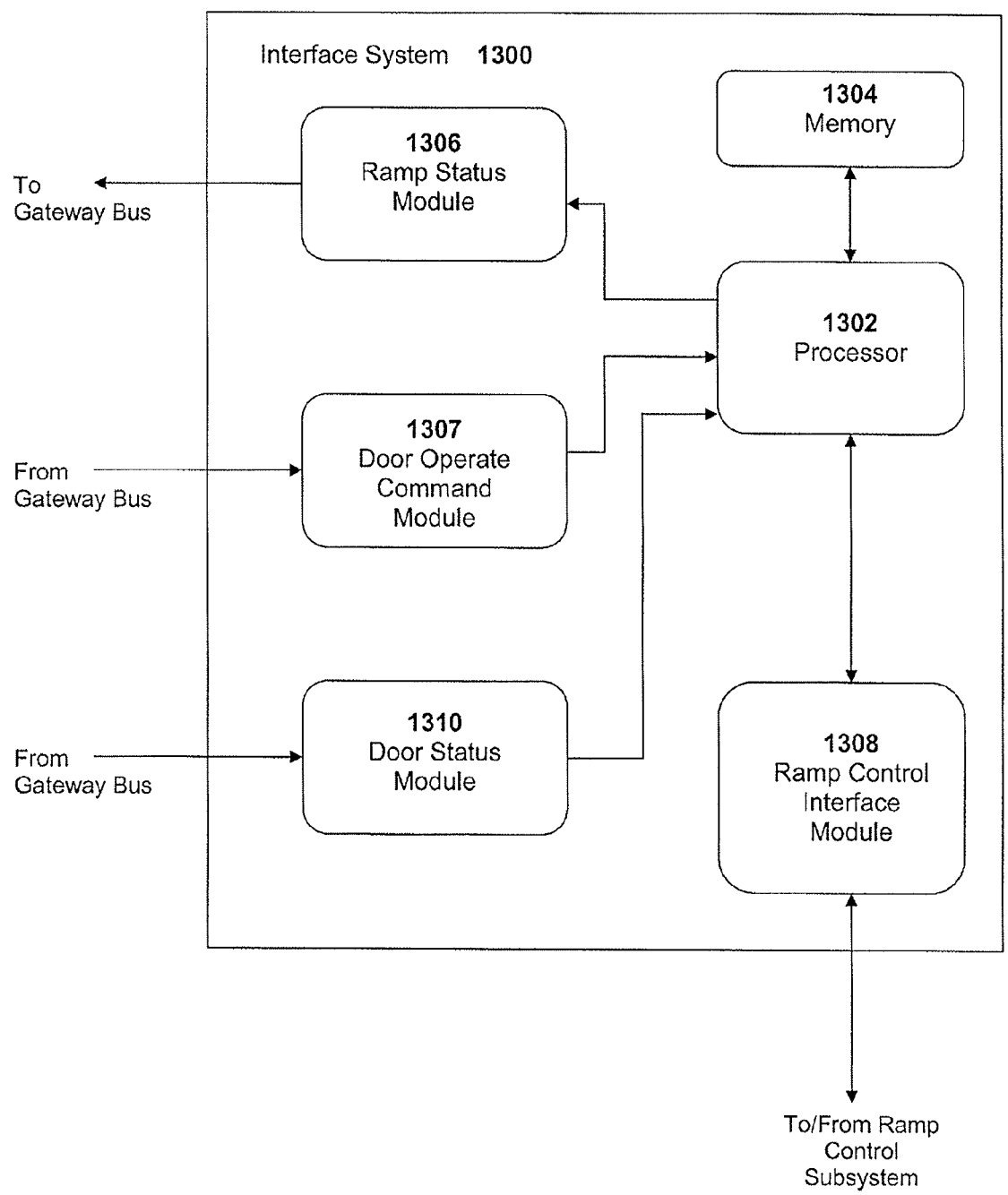
FIG. 2 is a functional block diagram of an interface system of the door and ramp control system of FIG. 1.

The interface system 1300 is shown in more detail in FIG. 2 and generally includes a ramp status module 1306, a door status module 1310, a door operate command module 1307, and a ramp control interface module 1308. In addition, the interface system 1300 may include one or more processors 1302 and one or more computer-readable memories 1304 for receiving and communicating status signals and communicating with the ramp control subsystem 1342. Alternately or in addition, the ramp status module 1306, door status module 1310, door operate command module 1307 and ramp control interface module 1308 may include one or more memories and/or one or more processors (not shown). The memories 1304 may include a fixed or removable digital storage device including RAM, ROM or other devices for storing digital information. The processor 1302 may include a device or devices used to process digital information including microprocessors and/or programmable logic devices. The ramp status module 1306, door status module 1310, door operate command module 1307, ramp control interface module 1308, memory 1304 and processor 1302 may include software programs that utilize and/or manipulate data. The ramp status interface module 1306, door status module 1310, door operate command module 1307 and ramp control interface module 108 may be implemented separately and/or together in the same device in any combination.

The ramp control interface module 1308 is generally the module through which the interface system 1300 communicates with the ramp control subsystem 1342. The ramp control subsystem 1342 generally controls the movement of the ramp, such as during stowage and deployment. The ramp control interface module 1308 coordinates the movement of the ramp with that of the door to prevent interference between the two. For example, the ramp control subsystem 1342 may be configured so that it will not initiate movement of the ramp without a signal from the interface system 1300. The interface system 1300 may only communicate a ramp operation signal when the door status module 1310 has received a door status signal indicating that the status of the door is opened. In addition, the ramp control interface module 1308 may be the module through which the ramp control subsystem 1342 communicates the status of the ramp with the interface system 1300. The ramp status module 1306 may communicate the ramp status, such as "deployed" or "stowed," to the BCS 1329 or DCS 1330 via the gateway bus 1340, the gateway module 1338, and the data bus 1320. The door status module 1310 may receive door status signals sent over the data bus 1320 by the DCS 1330 via the gateway module 1338 and gateway bus 1340. The door operate command module 1307 may receive door activation signals sent from the gateway module 1338 over the gateway bus 1340. The door activation signals may have initially been sent to the gateway module 1338 by the remote device 1322 via the data bus 1320, or from the door operation indicator 1390 via the BCS 1329 and data bus 1320.

Other devices not illustrated in FIGS. 1 or 2, such as other modules or door activation buttons or switches located in different areas of the vehicle, may also send activation signals over the data bus 1320. The ramp control module 1308 and the interface system 1300 may be implemented together, as illustrated, or as separate modules or devices.

Figure 3:
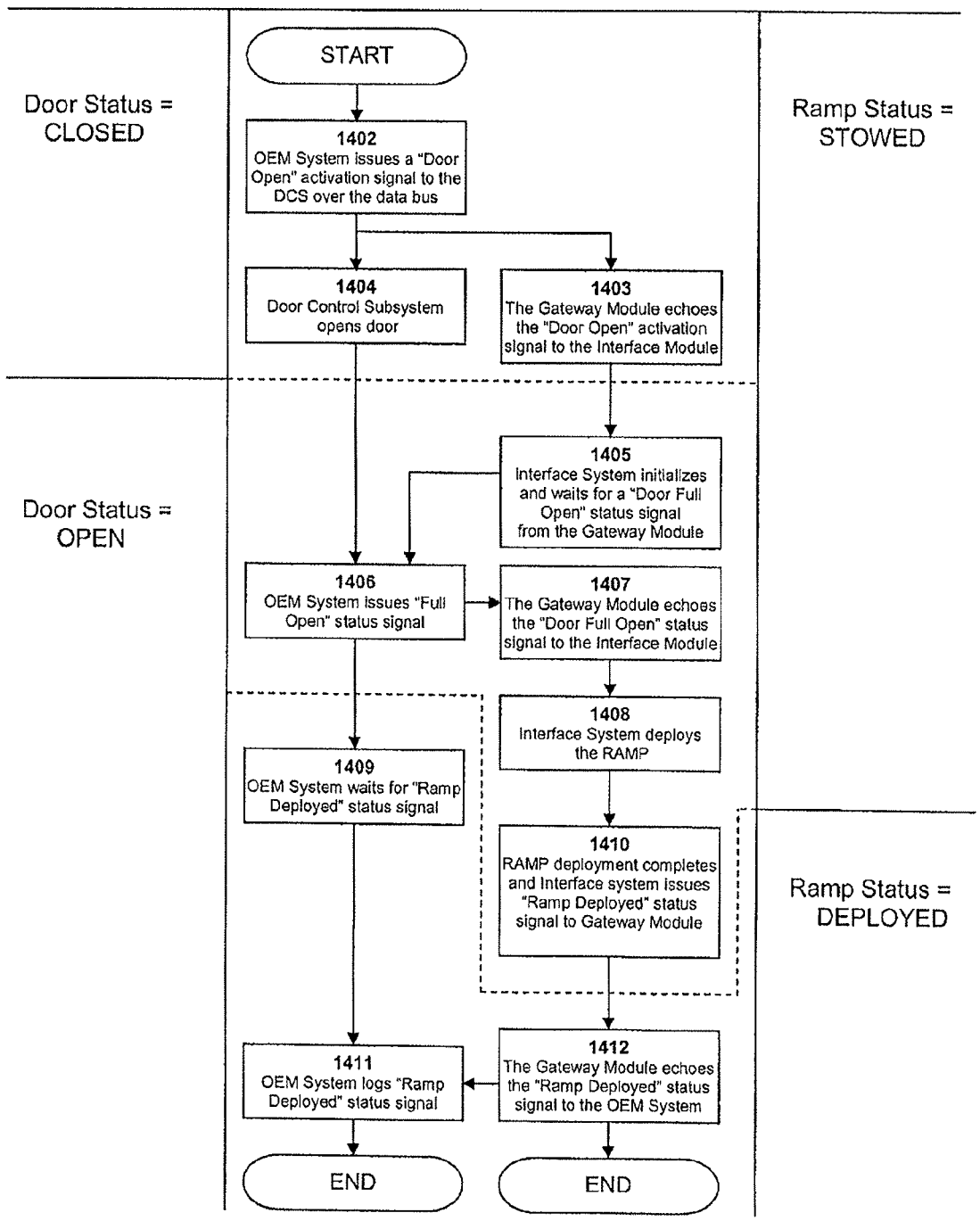
FIG. 3 is a flow chart of a method for opening a door and deploying a ramp in response to a signal from a remote device.
Figure 4:
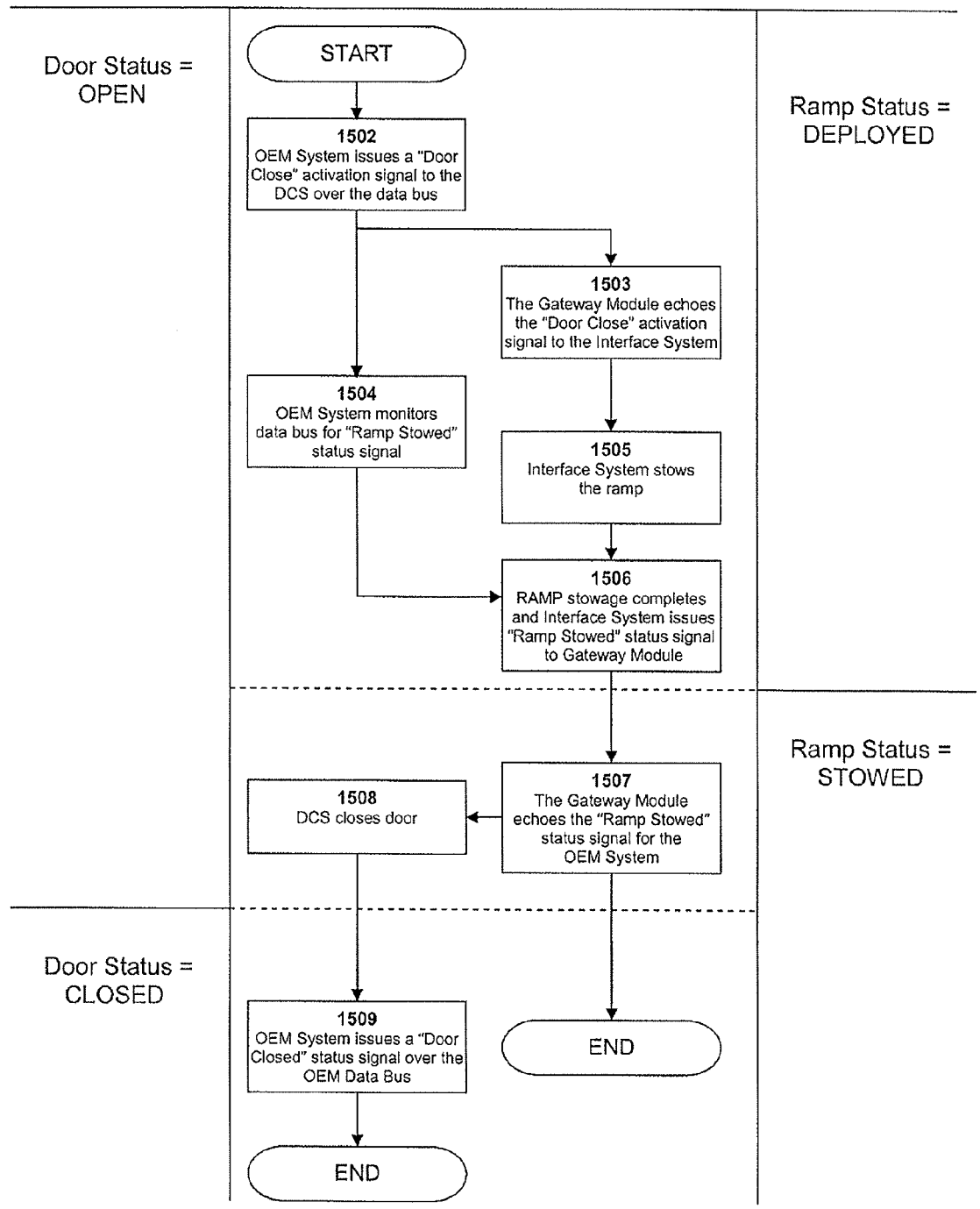
FIG. 4 is a flow chart of a method for stowing a ramp and closing a door in response to a signal from a remote device.

FIGS. 3 and 4 illustrate examples of the way in which an interface system, such as the interface system 1300 shown in FIG. 2, may operate to prevent interference between the ramp and the door through the use of status signals transferred between the OEM system 1350 and the interface system 1300 using the gateway module 1338 shown in FIG. 1. In FIGS. 3 and 4, the steps of the method are indicated in the center column with the status of the door and the step or steps after which the door status changes in the left column. Similarly, the status of the ramp and the step or steps after which the ramp status changes are shown in the right column. The descriptions of the methods shown in FIGS. 3-4 include references to the components of FIGS. 1 and 2.

FIG. 3 shows an example of the way in which an interface system 1300, such as that shown in FIGS. 1 and 2, prevents ramp and door interference when an activation signal, communicated over the data bus 1320 via a remote device 1322 or an operation indicator 1390 signals the door to open and the ramp to deploy. Initially, as shown in FIG. 3, the status of the door is "closed," as communicated by the DCS 1330 and the status of the ramp is "stowed," as communicated by the ramp status module 1306 of the interface module 1300. In step 1402, an activation signal in the form of a door open command is communicated over the data bus 1320. In step 1403, the gateway module 1338 receives the door open command from the data bus 1320, and echoes the door open command over the gateway bus 1340 to the interface system 1300. In step 1404, the DCS 1330 responds to the activation signal on the data bus 1320 and begins to open the door. In step 1405, the interface system 1300 initializes in response to the door open command but does not activate the ramp. Instead, the interface system 1300 waits for a door status message indicating that the door is fully open (a "door full open status message"). Once the door is fully open in step 1406, the full open indicator 1391 sends a signal to the DCS 1330, which in turn sends a door fully open status signal over the data bus 1320. In step 1407, the gateway module 1338 echoes the door fully open status signal to the interface system 1300 via the gateway bus 1340. In step 1408, the interface system 1300, knowing that the door is fully open, deploys the ramp by communicating with the ramp control subsystem 1342. In step 1409, the OEM system 1350 waits for a "ramp deployed" status signal. In step 1410, once deployment of the ramp is complete, the interface system 1300 sends a ramp deployed status signal to the gateway module 1338 via the gateway bus 1340. In step 1412, the gateway module 1338 echoes the ramp deployed status signal on the data bus 1320 for receipt by the OEM subsystems and modules. In step 1411 the OEM System logs the ramp status as "deployed." At the end of this process, the status of the door is "open" and the status of the ramp is "deployed."

FIG. 4 shows an example of the way in which the interface system 1300 may prevent ramp and door interference when an activation signal in the form of a "door close" command is transmitted over the data bus 1320 by way of the remote device 1322 and receiver 1326, by way of the door operation indicator 1390 and BCS 1329, or by another subsystem or module connected to the data bus 1320. When the interface system 1300 receives the "door close" command, it interprets the "door close" command as instructing the ramp to stow and the door to close. Initially, as shown in FIG. 4, the status of the door is "open," as communicated by the OEM system 1350 and the status of the ramp is "deployed," as communicated by the ramp status module 1306. In step 1502, the OEM System 1350 communicates the "door close" activation signal. The gateway module 1338 and the DCS 1330 then receive the "door close" activation signal via the data bus 1320. In step 1503 the gateway module 1338 echoes the "door close" activation signal to the interface system 1300, which interprets the door close activation signal as a signal to begin stowing the ramp. In step 1504, due to the ramp deployed status message sent in step 1410 of FIG. 3, the DCS 1330 is aware that the ramp is extended in step 1503 of FIG. 4. Accordingly, the DCS 1330 monitors the data bus 1320 and waits for a "ramp stowed" status signal. In step 1505, the interface system 1300 activates the ramp control subsystem 1342 to stow the ramp. In step 1506, once the ramp is fully stowed the interface module 1300 issues a "ramp stowed" status message over the gateway bus 1340 to the gateway module 1338. In step 1507 the gateway module 1338 echoes the ramp stowed status message to the OEM system via the data bus 1320. The DCS 1330 detects the ramp status signal indicating that the status of the ramp is "stowed". In response, the DCS 1330 closes the door in step 1508. Once the door is closed, the DCS sends a "door closed" status signal over the data bus 1320 in step 1509. At the end of this process, the status of the door is "closed" and the status of the ramp is "stowed."

Figure 5:
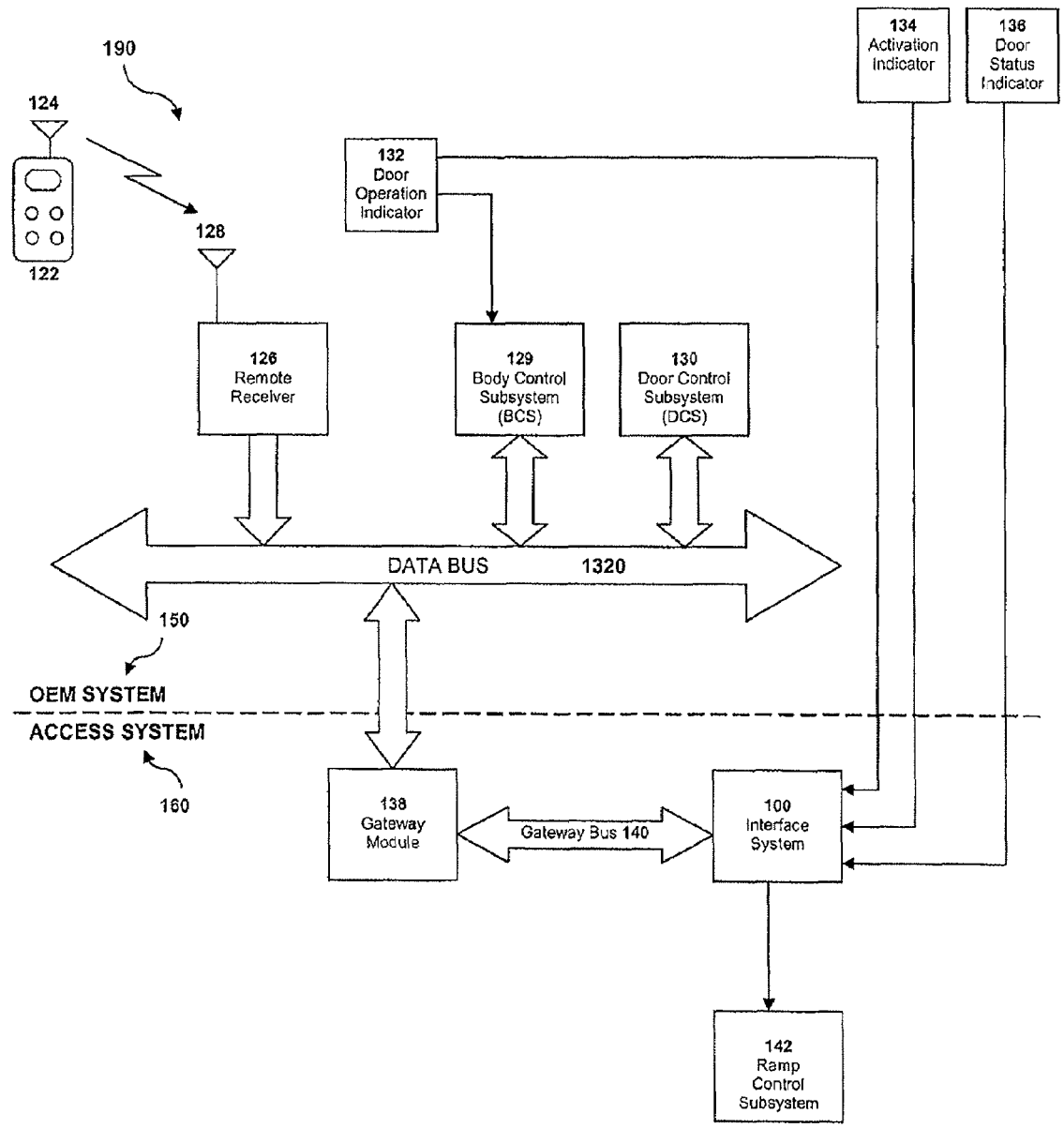
FIG. 5 is a functional block diagram of a door and ramp control system.

FIG. 5 illustrates an example of an interface system 100 as implemented in an alternative door and ramp control system 190. The interface system 100 prevents interference between the door and ramp by using status signals sent over the data bus 1320 to control operation of the door, while using systems in the vehicle other than the data bus 1320 to determine the status of the door (a "door status indicator" 136) to coordinate operation of the ramp. Whereas the status signals and commands sent over the data bus 1320 are in the form of computer-readable data, signals received from the other systems in the vehicle generally consist of discrete electrical signals, such as the presence or absence of a specified level of voltage over a wire.

In the system illustrated in FIG. 5, the interface system 100 does not receive door status signals from the BCS 129 over the data bus 1320 that may indicate whether the door is open, closed or in a position between open and closed. As shown in FIG. 5, the interface system 100 communicates with the data bus 1320 through a gateway bus 140 and a gateway module 138. The gateway module 138 may translate signals communicated by the interface system 100 to the data bus 1320 into a format compatible with that of the data bus 1320 and the other modules involved in controlling the door. For example, the interface system 100 may communicate signals compatible with a LIN bus while the OEM data bus is a CAN data bus. Therefore, the gateway module 138 may translate signals compatible with a LIN bus to those compatible with a CAN bus. The gateway module 138 may also be configured to translate signals compatible with different bus protocols, or, if the gatway bus 140 and data bus 1320 use the same bus protocol, the gateway module may not be required to translate any signals and may act instead as a filter that selectively passes signals back and forth between the gateway bus 140 and data bus 1320. In one embodiment, the gateway module 138 may be a one-way module that is configured to enable the interface system 100 to communicate ramp status signals with the BCS 129 and/or the DCS 130 via the data bus 1320, while preventing signals from the OEM System 150, such as door status signals and activation signals, from being communicated to the interface system 100. In other embodiments, the gateway module 138 may be a two-way module configured to communicate only certain types of signals from the data bus 1320 to the interface system 100.

In embodiments where the gateway module 138 is incapable of communicating "door open" and "door close" requests from the data bus 1320 to the interface system 100, the interface system 100 may be coupled to other vehicle components in order to determine if a request to open or close the door has been made. In this regard, the ramp control subsystem 142 may be activated by an activation signal not initiated from the data bus 1320 via the interface system 100. In general, the interface system 100 may determine whether an activation signal has been received by monitoring one or more systems of the vehicle other than the data bus 1320. For example, the interface system 100 may be in communication with a door operation indicator 132, such as a switch, and can thus receive activation signals without monitoring the data bus 1320. To determine whether an activation signal has been received from a remote device 122, the interface system 100, may monitor other systems (each an "activation indicator") within the vehicle that are activated when the remote device 122 is activated. For example, if the vehicle is configured so that the tail lights flash when an activation signal is received, the interface system 100 may monitor, for example, the tail lights, horn and/or interior vehicle lights. When the interface system 100 detects that certain lights have flashed or the horn has sounded in a certain way, the interface system 100 may interpret those events as a request to open or close the door and deploy or stow the ramp.

In embodiments where the gateway module 138 is incapable of communicating "door open" and "door close" status signals from the data bus 1320 to the interface system 100, the interface system 100 may monitor one or more door status indicators 136 (only one door status indicator is illustrated in FIG. 5) to determine the status of the door as fully opened, fully closed, or between fully opened and fully closed. The door status indicator 136 may indicate whether the door is fully open via a door open indicator, such as an OEM or aftermarket switch (not shown), or in a position between full open and fully closed by monitoring the door open indicator and a door ajar indicator, which is generally an OEM component, but may also be an aftermarket item. The door ajar indicator may also be utilized to indicate that the door is fully closed. By communicating ramp status signals to the data bus 1320, and monitoring the status of the door using the door status indicators 136, the interface system 100 coordinates operation of the door and the ramp.

In some embodiments, the gateway module 138 may be configured to communicate only "door open" and "door closed" status signals from the data bus 1320 to the interface system, while preventing communication of the "door open" and "door close" requests from the data bus to the interface system. In these embodiments, it may be unnecessary to couple the interface system 100 to one or more door status indicators 136 because the door status signals are instead communicated to the interface system from the data bus 1320 via the gateway module 138 and gateway bus 140 as discussed above with respect to the embodiment of FIG. 1.

Figure 6:
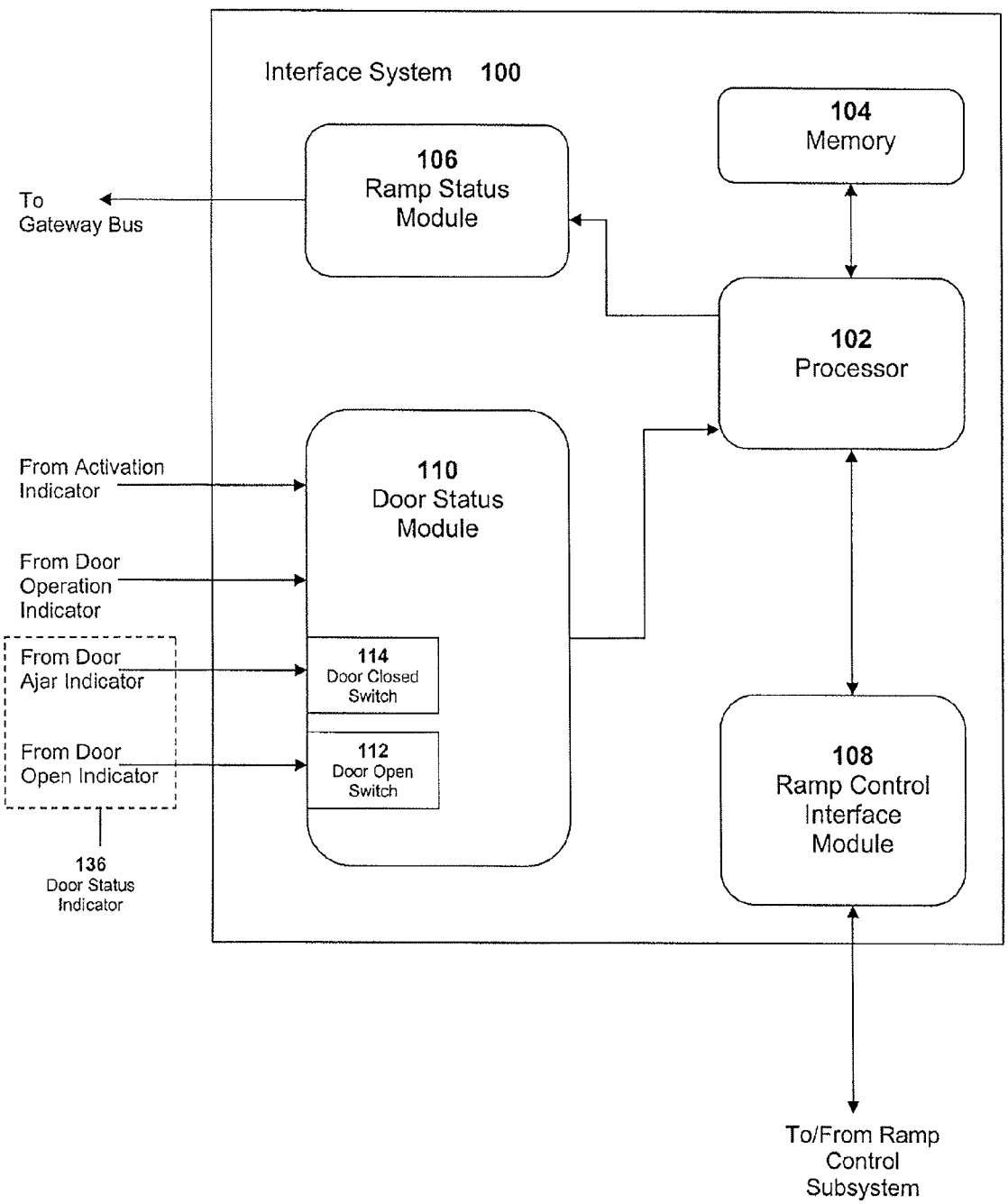
FIG. 6 is a functional block diagram of an interface system of the door and ramp control system of FIG. 5.

The interface system 100 is shown in more detail in FIG. 6 and generally includes a ramp status module 106, a door status module 110 and a ramp control interface module 108. In addition, the interface system 100 may include one or more processors 102 and one or more computer-readable memories 104 for receiving and communicating status signals and communicating with the ramp control subsystem 142. Alternately or in addition, the ramp control interface module 108 may include one or more memories 104 and/or one or more processors 102 (not shown). In the example shown in FIG. 6, the door status module 110 identifies the status of the door as "full open" if the door is open, or "closed" if the door is between fully open and fully closed or if the door is fully closed. The door status module 110 may include a door open switch 112 and a door closed switch 114. The door open switch 112 may be in either an "on" position (e.g. a position that allows current to conduct) or an "off" position (e.g. a position that forms an open circuit) if the door is fully open, depending upon the specific configuration of the door status module 110 and/or the door status indicator 136. Similarly, the door closed switch 114 may be in an "on" position or an "off" position if the door is fully closed or ajar depending upon the specific configuration of the door status module 110 and/or the door status indicator 136.

The ramp control interface subsystem 108 is generally the subsystem module through which the interface system 100 communicates with the ramp control subsystem 142. The ramp control subsystem 142 generally controls the movement of the ramp, such as during stowage and deployment. The ramp control interface module 108 coordinates the movement of the ramp with that of the door to prevent interference between the two. For example, the ramp control subsystem 142 may be configured so that it will not initiate movement of the ramp without a signal from the ramp control interface module 108 and the interface module 100 may only communicate this signal when the interface control module 100 has detected an activation indicator, and the door status indicator 136 communicates that the door is fully open. In addition, the ramp control interface module 108 may be the module by which the ramp control subsystem 142 communicates the status of the ramp with the interface system 100. The ramp status module 106 may communicate the ramp status, such as "deployed" or "stowed," to the OEM system 150 via the gateway bus 140, gateway module 138 and the data bus 1320. The ramp control subsystem 108 and the interface system 100 may be implemented together or in separate modules as shown in FIG. 5.

Figure 7:
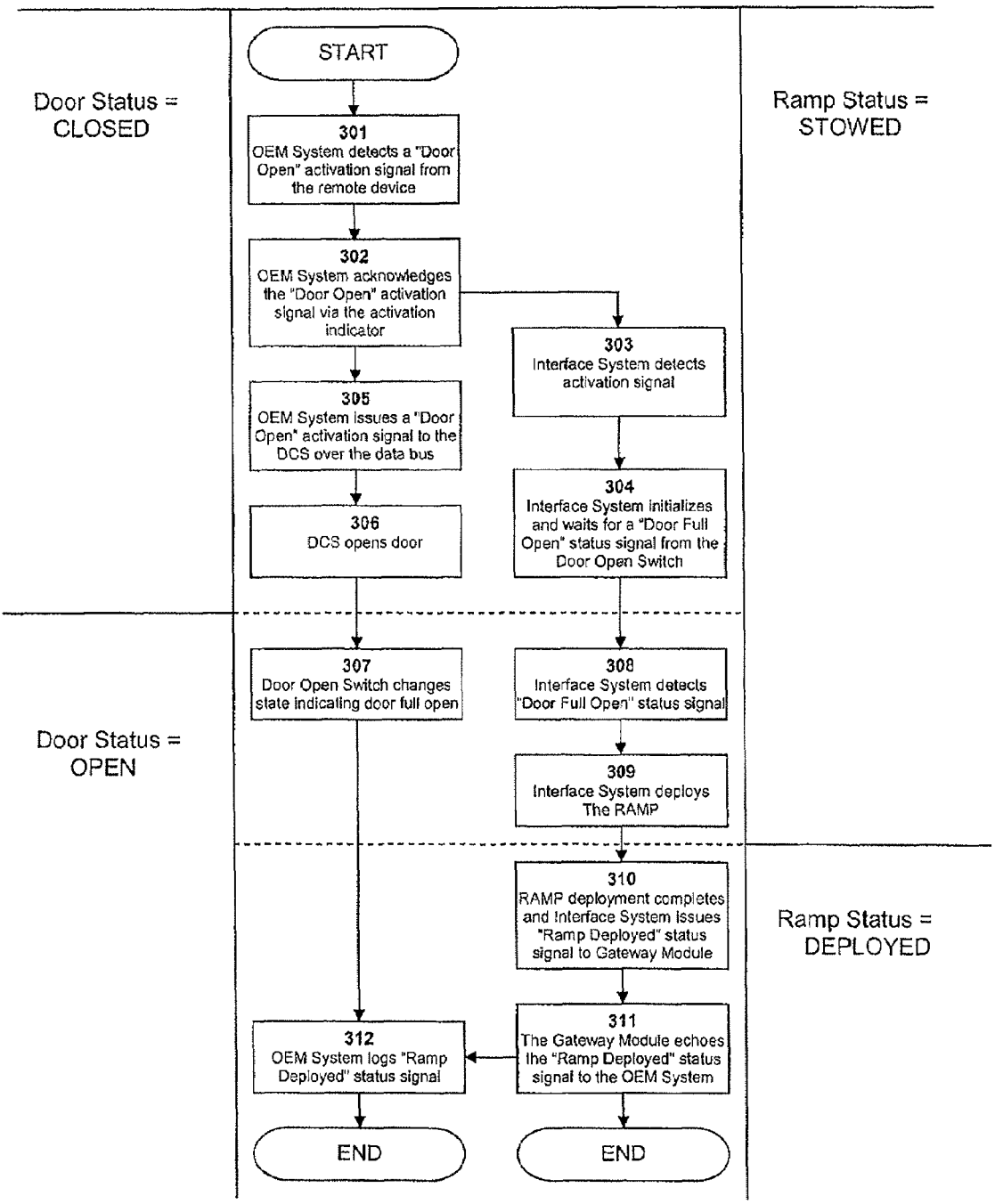
FIG. 7 is a flow chart of a method for opening a door and deploying a ramp in response to a signal from a remote device.
Figure 8:
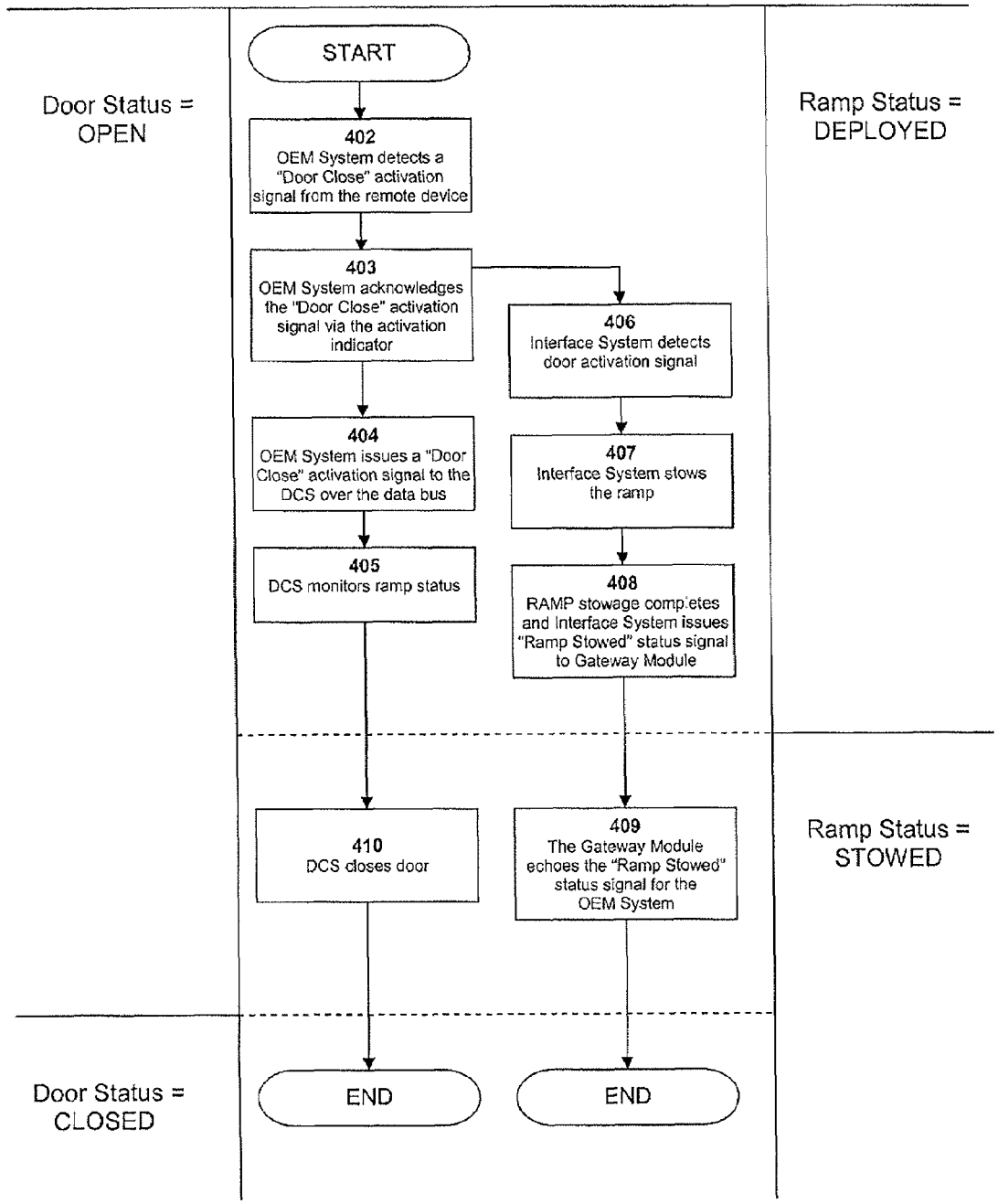
FIG. 8 is a flow chart of a method for stowing a ramp and closing a door in response to a signal from a remote device.

FIGS. 7-8 illustrate examples of the way in which the interface system 100, employing a one-way gateway module 138, may operate to prevent interference between the ramp and the door through the use of status signals. The one way gateway module 138 transmits ramp status signals to the OEM system 150 but does not receive activation or status signals from the OEM system 150. In FIGS. 7-8, the steps of the method are indicated in the center column with the status of the door and the step or steps after which the door status changes in the left column. Similarly, the status of the ramp and the step or steps after which the ramp status changes are shown in the right column. The descriptions of the methods shown in FIGS. 7-8 include references to FIGS. 5 and 6.

FIG. 7 shows an example of the way in which the interface system 100 prevents ramp and door interference when an activation signal, communicated via a remote device 122 signals the door to open and the ramp to deploy. Initially, as shown in FIG. 7, the status of the door is "closed," which is detected by the door status module 110 of the interface system 100 and the status of the ramp is "stowed," as communicated by the ramp status module 106 of the interface module 100 over the data bus 1320 via the gateway bus 140 and the gateway 138. In step 301, the remote device 122 wirelessly communicates an activation signal via its antenna 124, for example in response to the push of a button on a key fob. The activation signal is received by the remote receiver 126 via the remote receiver antenna 128 and communicated to the other components of the OEM system via the data bus 1320. In step 302 the OEM System acknowledges receipt of the remote command by activating, for example, one or more of the tail lights, horn, and interior vehicle lights, each of which is or comprises the activation indicator 134. In step 303, the interface system 100 detects that an activation signal has been communicated by monitoring the activation indicator 134 (e.g. the tail lights of the vehicle). In step 304 the interface system 100 initializes and waits for the door status indicator 136 to indicate to the door status module 110 that the door is fully open. In step 305 the OEM system 150 issues a door open command to the DCS 130 over the data bus 1320. In response, the DCS 130 opens the door in step 306. In step 307 the door status indicator 136 changes state to indicate that the door is fully open. Substantially simultaneously in step 308, the interface system 100 detects the door fully open status signal from the door status indicator 136. In response, at step 309, the interface system 100 deploys the ramp by communicating with the ramp control subsystem 142. Once ramp deployment has completed at step 310, the interface system 100 issues a ramp deployed status signal to the gateway module 138. In step 311, the gateway module 138 translates (if necessary) and echoes the ramp deployed status signal over the data bus 1320. The final step 312 has the OEM system logging the ramp status as deployed. At the end of this process, the status of the door is "open" and the status of the ramp is "deployed."

FIG. 8 shows an example of the way in which the interface system 100 prevents ramp and door interference when an activation signal, communicated via a remote device 122, activates the ramp to stow and the door to close. Initially, as shown in FIG. 8, the status of the door is "open," which is detected by the door status module 110 and the status of the ramp is "deployed," as communicated by the ramp status module 106 over the data bus 1320. In step 402, an activation signal is communicated wirelessly by the remote device 122 to the remote receiver 126. In step 403, the OEM system acknowledges the activation signal by activating the activation indicator 134, which may include one or more vehicle systems such as the tail lights, horn, or interior vehicle lights. In step 404 the OEM system 150 issues a "door close" signal to the DCS 130 over the data bus 1320, however because the ramp status is "deployed," the DCS 130 does not close the door but instead monitors the data bus 1320 for a change in ramp status in step 405. In step 406, the interface system 100 detects that an activation signal has been communicated via the activation indicator 134. Because the status of the ramp is "deployed," as detected by the ramp control interface module 108, the interface system 100 stows the ramp in response to the activation signal in step 407. In step 408, ramp stowage completes and the interface system 100 communicates a ramp status signal to the gateway module 138 indicating that the status of the ramp is "stowed." The gateway module 138 echoes this signal to the data bus 1320 in step 409. In step 410, the DCS 130 receives the ramp stowed status signal from the the data bus 1320 and responds in step 409 by closing the door. The interface system 100 detects when the door is fully closed via the door status indicator 136 and door closed switch 114. At the end of this process, the status of the door is "closed" and the status of the ramp is "stowed."

Figure 9:
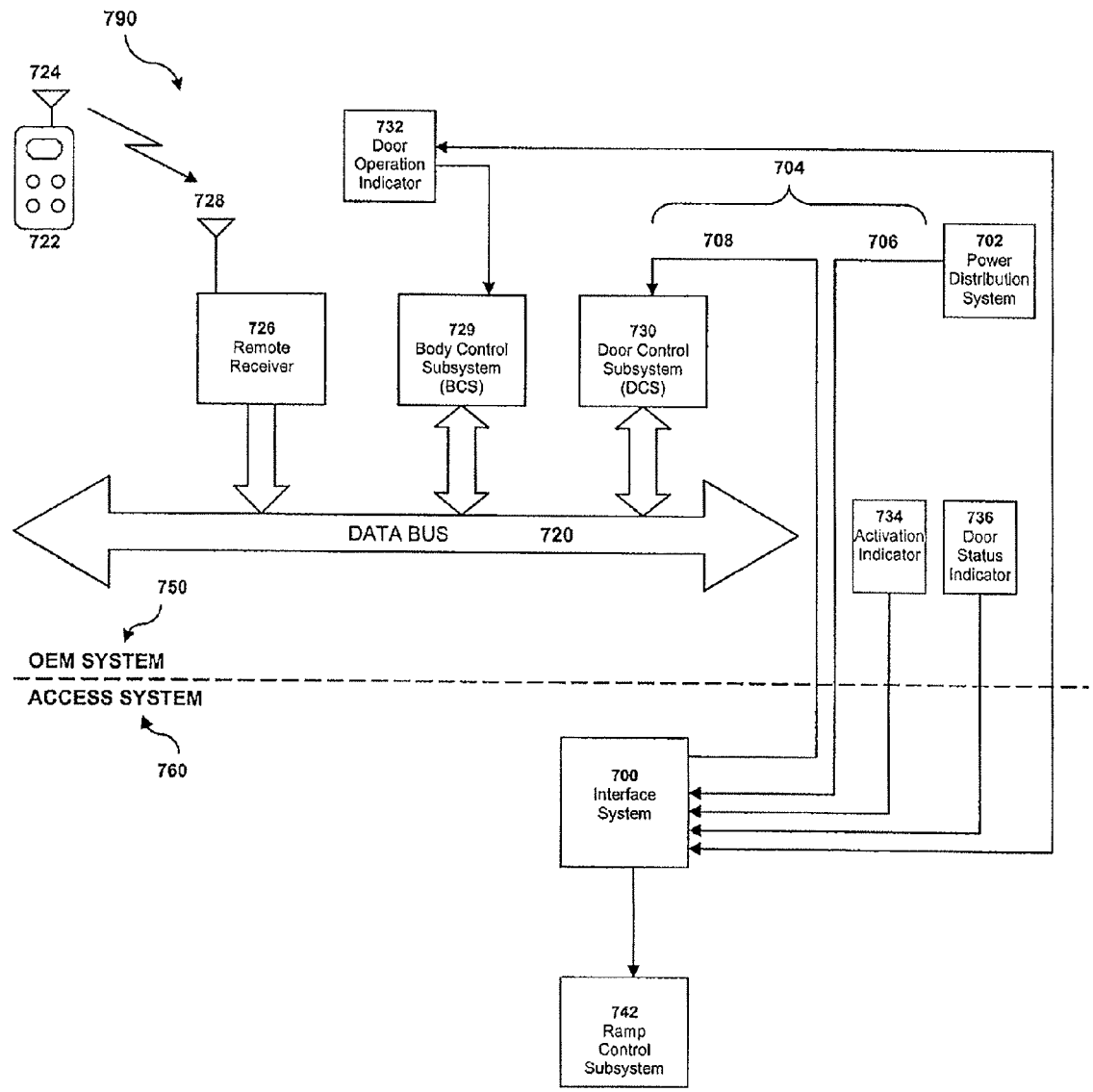
FIG. 9 is a functional block diagram of a door and ramp control system.
Figure 10:
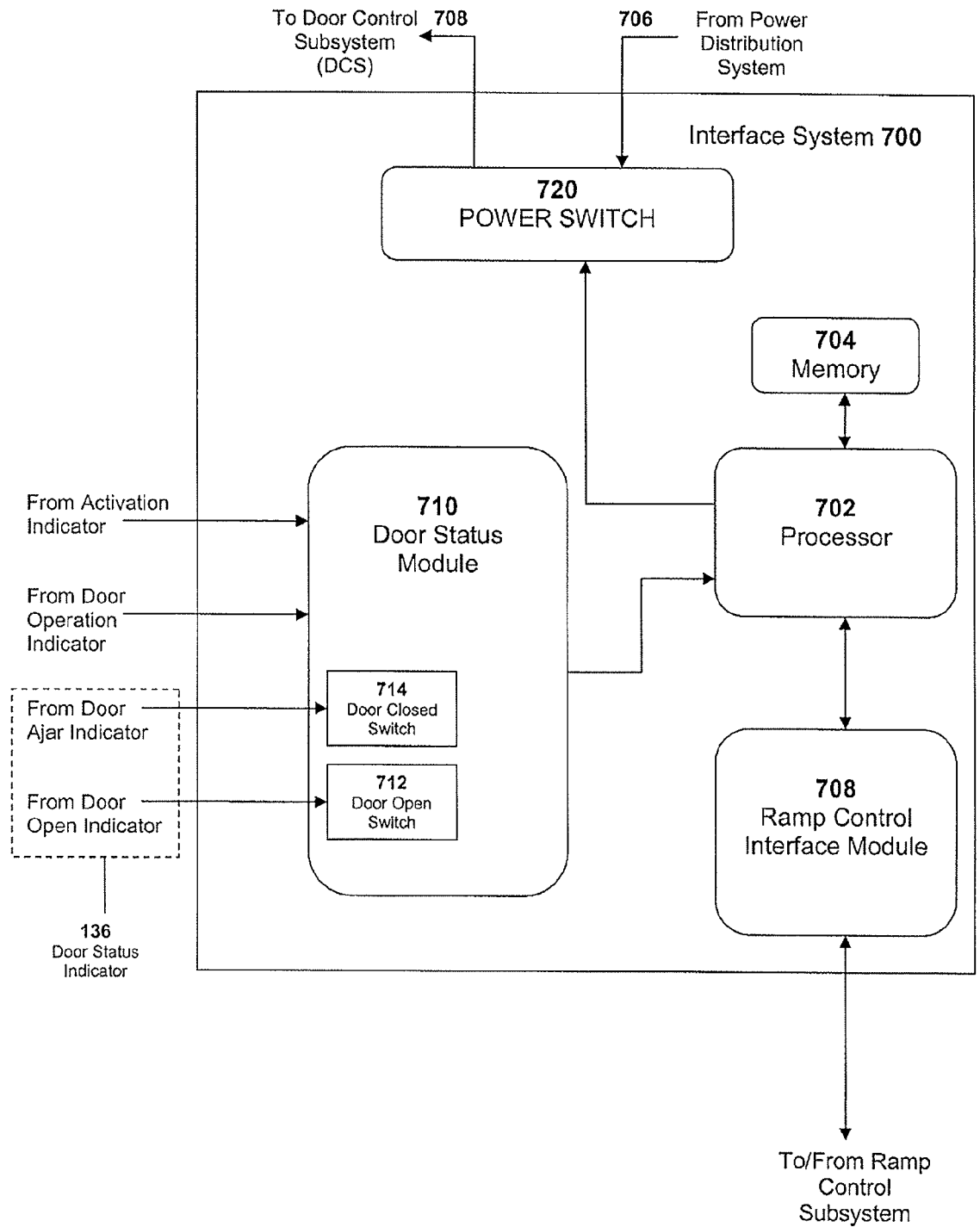
FIG. 10 is a functional block diagram of an interface system of the door and ramp control system of FIG. 9.

Another example of an interface system implemented in a vehicle is shown in FIGS. 9 and 10. In general, the interface system 700 prevents operational interference between a ramp of an access system and the door of the vehicle by controlling power to the DCS 729, which controls operation of the door, and by monitoring signals received from other vehicle systems to determine when to operate the ramp. In a manner similar to that described in connection with FIGS. 5-6, the interface system 700 of FIGS. 9 and 10 may determine whether an activation signal has been received from a remote device 722 by monitoring an activation indicator 734 or receiving the activation signal from a door operation indicator 732. However, the interface system 700 of FIGS. 9 and 10 is not in communication with and thus does not communicate ramp status signals with the data bus 720 in order to control the operation of the door.

The interface system 700 of FIGS. 9 and 10 controls operation of the door by controlling the power supplied to the DCS 730. For example, the interface system 700 may be inserted in series between the power distribution system 702 of the vehicle and the DCS 730. The power line 704 that communicates the power from the power distribution system 702 to the DCS 730 maybe spliced into a first section 706 and a second section 708. As shown in FIG. 10, the first section 706 and the second section 708 may be placed in communication with a power switch 720 of the interface system 700 so that the first section 706 communicates power to the power switch 720 and the second section 708 communicates the power to the DCS 730. When the interface system 700 has determined that the ramp is deployed, for example according to a signal communicated from the ramp control subsystem 742 to the ramp control interface module 708, the power switch 720 may switch to or remain in an approximately non-conductive position so that power from the power distribution system 708 may be uncoupled from the DCS 730. Thus, operation of the DCS 730 may be disabled. In other words, the status of the power to the DCS 730 may be considered "off." Otherwise, the power switch 720 will switch into or remain in an approximately conductive position so that the power may be communicated with the DCS 730. Thus, operation of the DCS 730 may be enabled. In other words, the status of the power to the DCS 730 may be considered "on." The interface system 700 may also include a memory 704, a processor 702, and door status module 710 including the door closed switch 714 and the door open switch 712 may be similar to those described in connection with FIGS. 5 and 6.

Figure 11:
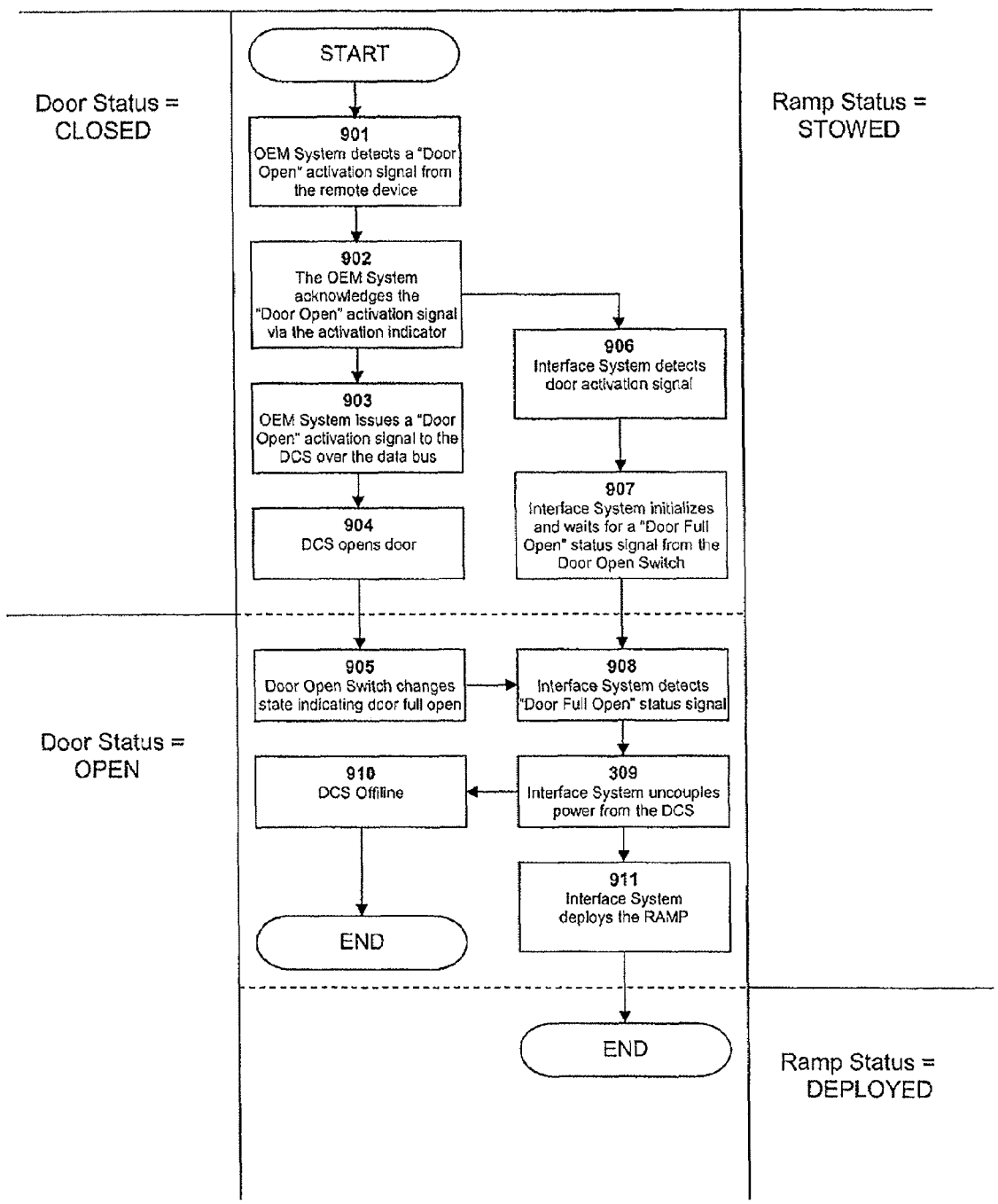
FIG. 11 is a flow chart of a method for opening a door and deploying a ramp in response to a signal from a remote device.
Figure 12:
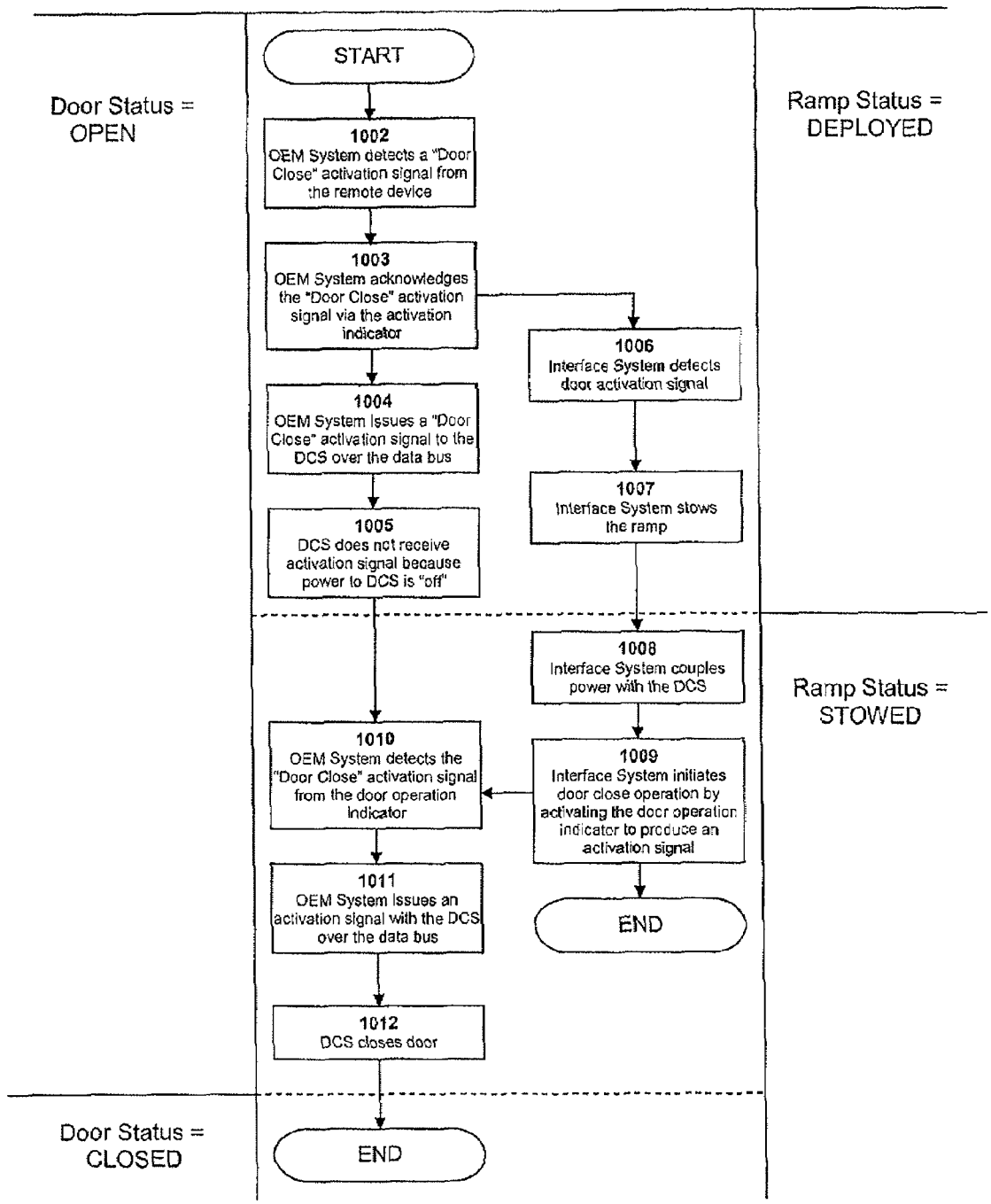
FIG. 12 is a flow chart of a method for stowing a ramp and closing a door in response to a signal from a remote device.

FIGS. 11-12 illustrate examples of the way in which the interface system 100 may operate to prevent operational interference between the ramp and the door by using door status signals and controlling the power supplied to the DCS 730. Thus, in FIGS. 11-12, the steps of the method are indicated in the center column. The status of the ramp and the step or steps after which the ramp status changes are shown in the right column, the status of the door and the step or steps after which the door status changes are shown in the left column. The descriptions of the methods shown in FIGS. 13-16 include references to FIGS. 9 and 10.

FIG. 1 shows an example of the way in which the interface system 700 may prevent ramp and door interference when an activation signal, communicated via a remote device 722 or via a door operation indicator 732 is received by the OEM system 750. Initially, as shown in FIG. 11, the status of the door is "closed," which is detected by the door status module 736 of the interface system 700, the status of the ramp is "stowed," as detected by the ramp control interface subsystem 708 and the power to the DCS is "on," indicating that the power switch 720 is in an approximately conductive position. In step 901, an activation signal is communicated wirelessly by remote device 122 via its antenna 724 to the antenna 728 of the remote receiver 726. In step 902, the OEM system acknowledges the activation signal via an activation indicator 734, such as the tail lights, horn and/or the interior vehicle lights. The OEM system communicates the activation signal to the DCS 730 via the data bus 720 in step 903. In step 904 the DCS opens the door. In step 905, the door open switch 712 changes state indicating the door is full open. In step 906, before the DCS opens the door, the interface system 700 detects the activation signal via activation indicator 734, such as the tail lights, horn and/or the interior vehicle lights, which was initiated in step 902, and monitors the door status indicator 736 in step 907. When the interface system 700 detects that the status of the door is "full open" in step 908, the interface system 700 uncouples power to the DCS via the power switch 720. At this time, the interface system 700 also deploys the ramp by communicating with the ramp control subsystem 742 in step 911. At the end of this process, the status of the door is "full open," the status of the ramp is "deployed" and the power to the DCS is "off."

FIG. 12 shows an example of the way in which the interface system 700 prevents ramp and door interference when an activation signal, communicated via a remote device 722, activates the ramp to stow and the door to close. Initially, as shown in FIG. 12, the status of the door is "open," as detected by the door status module 710, the status of the ramp is "deployed," as detected by the ramp control interface module 708 and the power to the door is "off." In step 1002, the remote device 722 wirelessly communicates an activation signal. In step 1003, the OEM system acknowledges the activation signal via one or more of the vehicle systems, such as the tail lights, horn and/or the interior vehicle lights. The OEM system communicates the activation signal to the DCS 730 via the data bus 720 in step 1004. However, because the power to the DCS 730 is "off," the DCS 730 does not receive the activation signal in step 1005. In step 1006, the interface system 700 detects that an activation signal has been communicated via the activation indicator 734, such as tail lights, horn and/or the interior vehicle lights, and detects that the status of the ramp is "deployed," as indicated by the ramp control subsystem 742. In step 1007 the interface system stows the ramp, and in step 1008 the interface system 700 couples power to the DCS 730. In step 1009, the interface system 700 initiates a door operation by activating, such as by toggling the door operation indicator 732 to produce a second activation signal. In response, OEM system detects the second activation signal in step 1010 and communicates the second activation signal with the DCS 730 via the OEM data bus 720 in step 1011. The DCS 730 closes the door in step 1012. At the end of this process, the status of the door is "closed," the status of the ramp is "stowed" and the power to the DCS 730 is "on." While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. An access system for a vehicle having a door control system that opens and closes a vehicle door, the door control system coupled to a vehicle data bus that carries data in a first format, the access system comprising:

a ramp control system including a ramp that is movable between a stowed position and a deployed position;

an interface system coupled to and communicating with the ramp control system to initiate movement of the ramp between the stowed and deployed positions, and to receive ramp status signals indicating whether the ramp is stowed or deployed;

a gateway module coupled to the vehicle data bus for communication thereon; and a gateway bus coupled to the gateway module and the interface system for carrying data signals therebetween, the gateway bus carrying data in a second format, wherein the interface system relays the ramp status signals to the gateway module via the gateway bus, wherein the gateway module relays the ramp status signals to the door control system via the vehicle data bus, and wherein the gateway module translates data from the first format to the second format for relaying data from the vehicle data bus to the gateway bus, and from the second format to the first format for relaying data from the gateway bus to the vehicle data bus.

2. The access system of claim 1, wherein the gateway module is configured to relay data signals relating to whether the door is opened or closed from the vehicle data bus to the gateway bus, and not to relay data signals relating to requests to open or close the door from the vehicle data bus to the gateway bus.

3. The access system of claim 2, wherein the vehicle includes at least one activation indicator that operates in response to a request to open or close the door, and wherein the interface system is coupled to the activation indicator to detect operation thereof in response to a request to open or close the door.

4. The access system of claim 3, wherein when the door is closed and the ramp is stowed, the interface system initializes upon detecting operation of the activation indicator and monitors the gateway bus for a data signal indicating that the door is fully open.

5. The access system of claim 4, wherein when the interface system receives the data signal indicating that the door is fully open, the interface system communicates with the ramp control system to initiate deployment of the ramp.

6. The access system of claim 3, wherein when the door is open and the ramp is deployed, the interface system communicates with the ramp control system to initiate stowing of the ramp upon detecting operation of the activation indicator.

7. The access system of claim 6, wherein when the interface system receives the ramp status signal indicating that the ramp is stowed from the ramp control system, the interface system sends a ramp stowed data signal to the gateway module via the gateway bus, and wherein the gateway module relays the ramp stowed data signal from the interface system to the door control system via the vehicle data bus.

8. The access system of claim 7, wherein when the door control system receives the ramp stowed data signal from the gateway module, the door control system closes the door.

9. The access system of claim 3, wherein the activation indicator includes a light, and wherein operation of the activation indicator includes flashing of the light.

10. The access system of claim 2, further comprising at least one door operation indicator that initiates a request to open or close the door, and wherein the interface system is coupled to the door operation indicator to determine when the request to open or close the door has been made.

11. The access system of claim 10, wherein the door operation indicator includes a manually-operable button that sends a ground signal to a body control subsystem of the vehicle, and wherein the interface system is coupled to the button to detect the ground signal.

12. The access system of claim 1, wherein the gateway module is a one-way module configured to relay data signals from the gateway bus to the vehicle data bus and not to relay signals from the vehicle data bus to the gateway bus.

13. The access system of claim 12, further comprising at least one door status indicator that detects when the door is fully open, and wherein the door status indicator is coupled to the interface system and sends a signal to the interface system to indicate that the door is fully open.

14. The access system of claim 13, wherein the vehicle includes at least one activation indicator that operates in response to a request to open or close the door, and wherein the interface system is coupled to the activation indicator to detect operation thereof in response to the request to open or close the door.

15. The access system of claim 14, wherein when the door is closed and the ramp is stowed, the interface system initializes upon detecting operation of the activation indicator and monitors the door status indicator for the signal indicating that the door is fully open.

16. The access system of claim 15, wherein when the interface system receives the signal indicating that the door is fully open, the interface system communicates with the ramp control system to initiate deployment of the ramp.

17. The access system of claim 14, wherein when the door is open and the ramp is deployed, the interface system communicates with the ramp control system to initiate stowing of the ramp upon detecting operation of the activation indicator.

18. The access system of claim 17, wherein when the interface system receives from the ramp control system the ramp status signal indicating that the ramp is stowed, the interface system sends a ramp stowed data signal to the gateway module via the gateway bus, and wherein the gateway module relays the ramp stowed data signal from the interface system to the door control system via the vehicle data bus.

19. The access system of claim 12, further comprising at least one door operation indicator that initiates a request to open or close the door, and wherein the interface system is coupled to the door operation indicator to determine when a request to open or close the door has been made.

20. A method for coordinating the operation of a vehicle power door with a ramp of an access system that provides wheelchair access to a vehicle when the door is open and the ramp is deployed, the vehicle including a vehicle data bus that carries data signals to control operation of the door, the method comprising:

coupling a gateway module to the vehicle data bus for communication on the vehicle data bus;

coupling an interface system to the gateway module via a gateway bus;

coupling the interface system to a ramp control subsystem that operates to stow and deploy the ramp and that sends a signal to the interface system indicating when the ramp is stowed;

locating the activation indicator in the vehicle that operates in response to a request to open or close the door;

coupling the interface system to an activation indicator to detect operation of the activation indicator;

stowing the ramp in response to detecting operation of the activation indicator;

sending a data signal from the interface system to the gateway module via the gateway bus when the ramp is fully stowed;

echoing the data signal over the vehicle bus, including translating the data signal from a first data format to a second data format; and closing the door in response to the echoed data signal on the vehicle data bus.

* * * * *